Patented Nov. 10, 1953

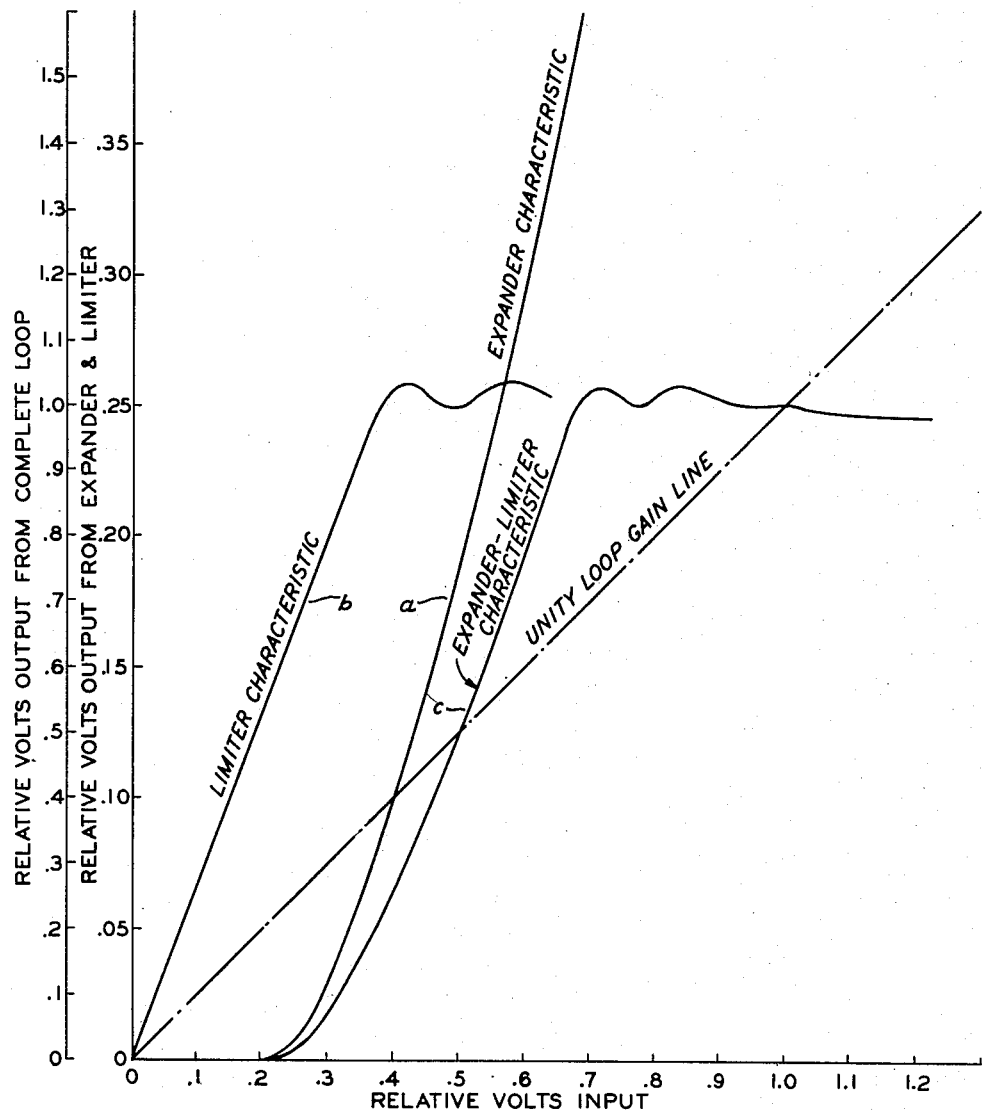

2,658,997

UNITED STATES PATENT OFFICE 2,658,997

PULSE REGENERATOR

Robert L. Carbrey, Summit, Cassius C. Cutler, Gillette, and Carl B. H. Feldman, Summit, N. J., assignors to Bell Telephone Laboratories, Incorporated, New York, N. Y., a corporation of New York Application July 27, 1950, Serial No. 176,238

12 Claims. (Cl. 250—27)

This invention relates to signal regeneration and more particularly to circuits for the regeneration of microwave pulses which comprise circulating pulse regenerators. Circulating pulse generators similar to the circulating pulse regenerators herein referred to are described in a copending application of C. C. Cutler, Serial No. 118,889, dated Sepetember 30, 1949, Patent No. 2,617,930, dated November 11, 1952.

It is an object of this invention to regenerate microwave pulses.

It is also an object of the invention to determine from a microwave signal modulated with recurrent pulses and spaces which of the signals are more likely to have been originated as pulses and which were more likely to have been originated as spaces. Further, it is an object to increase those signals which are determined to be pulses to a uniform amplitude and to reduce all others to zero. It is also an object of the invention to retime the signal pulses.

Another object of the invention is to gate a short representative segment of an incoming signal at the mid-period of each nominal pulse occurrence time into a regenerative repeater and then to gate the segment into an output circuit after having been allowed to circulate through the pulse regenerator for a predetermined number of times.

A circulating pulse regenerator is a loop circuit which, in one embodiment, comprises an expander, a limiter, an amplifier, a filter and a delay circuit. Pulses circulating in the loop will be sharpened by the expander which increases the amplitude of high level signals relative to low levels and will be limited at a peak amplitude established by the limiter. The amplifier is adjusted to give the loop unity gain at a norminal pulse amplitude so that pulses of that amplitude will tend to circulate indefinitely unless removed from the loop. The delay circuit controls the time required for a pulse to circulate through the loop.

Systems wherein intelligence is transmitted by pulses, including binary systems wherein the intelligence to be communicated is represented by pulses and spaces arranged in accordance with a particular code are known in the art. In such systems as the latter, the pulses are originated with a uniform amplitude since it is necessary at a receiver to detect only the presence or absence of a pulse during a particular interval of time. Due to noise and other interference, however, the pulses may become varied in amplitude and the spaces may be replaced by an appreciable signal. It is therefore desirable at a repeater, for example, to return the pulses to a uniform amplitude and to attenuate the signal during spaces to substantially zero so that the pulses may acquire new noise disturbances in transmission to the succeeding repeater without retaining the disturbances acquired in the preceding transmission path.

A pulse repeater in accordance with a specific embodiment of the invention takes a very short sample of the incoming signal proportional to its amplitude at the mid-period of the nominal pulse occurrence time. If the signal from which the sample is taken originated as a pulse, it is probable that, at the repeater, it will be more than one-half of its original standard amplitude. Conversely, if it originated as a space, it is equally probable that the sample will be less than one-half of a standard pulse amplitude. This of course assumes that the chosen standard amplitude is sufficient to give a minimum signal to noise ratio of six decibels for most transmission conditions. The repeater is therefore designed at amplify all samples of greater than the half-standard amplitude and attenuate all others. The elements which perform these operations will usually not increase the pulses to standard amplitude or attenuate the noise to zero in one operation on the sample. Therefore, the samples are subjected to the reshaping operation more than once by circulating them through the pulse regenerator for a sufficient number of times to perform the required reshaping. A limiter is included in the regenerator circuit to standardize the amplitude of the reshaped pulses. Timing circuits are provided to introuce the samples into the circulating regenerator and to abstract the reshaped pulses after their predetermined number of trips through the loop.

The invention may be better understood by a consideration of the following detailed description of illustrative embodiments when read in accordance with the attached drawings in which.

Figure 2:
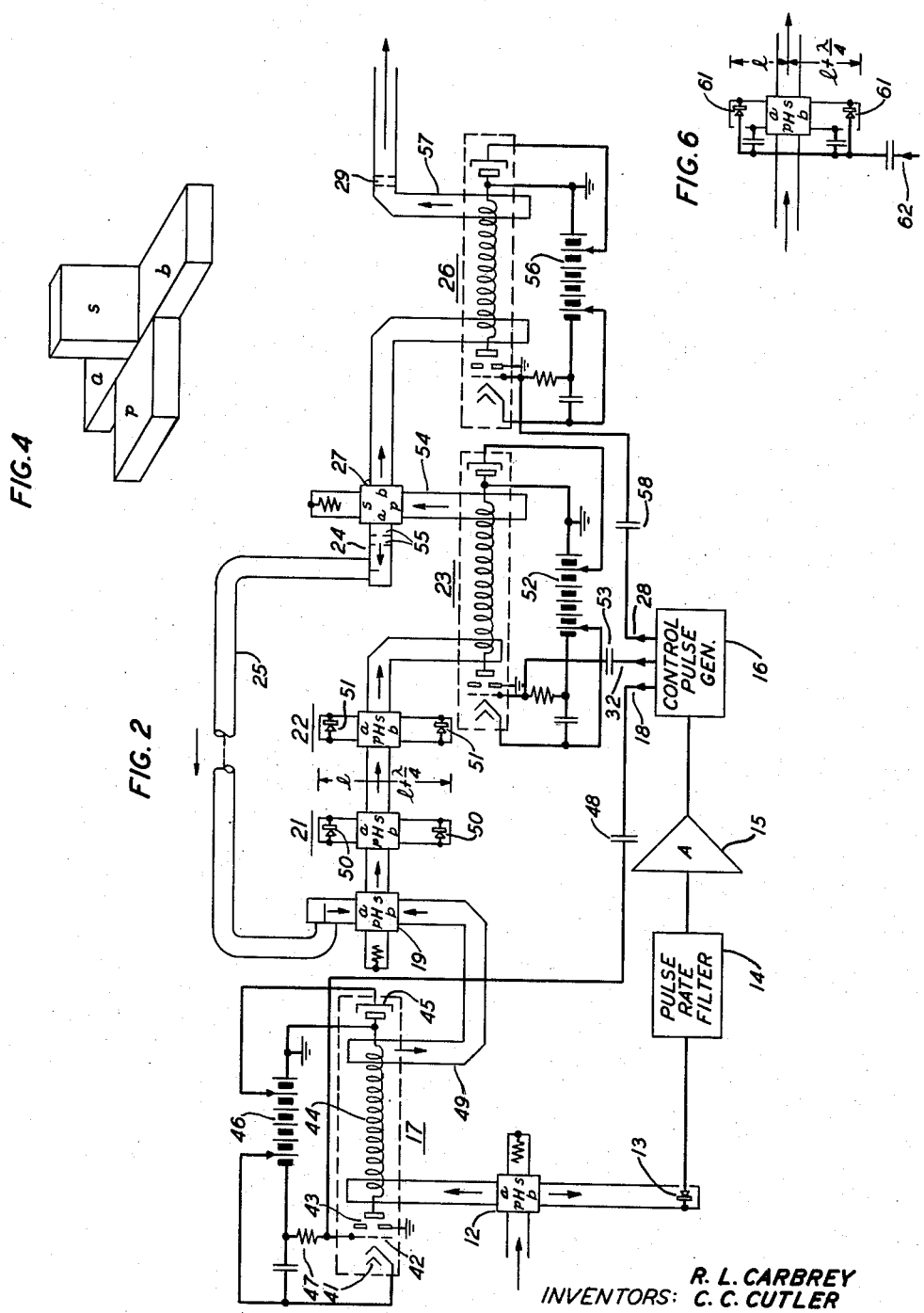
Fig. 2 is a schematic diagram of a specific repeater of the type shown in Fig. 1.
Figure 3:
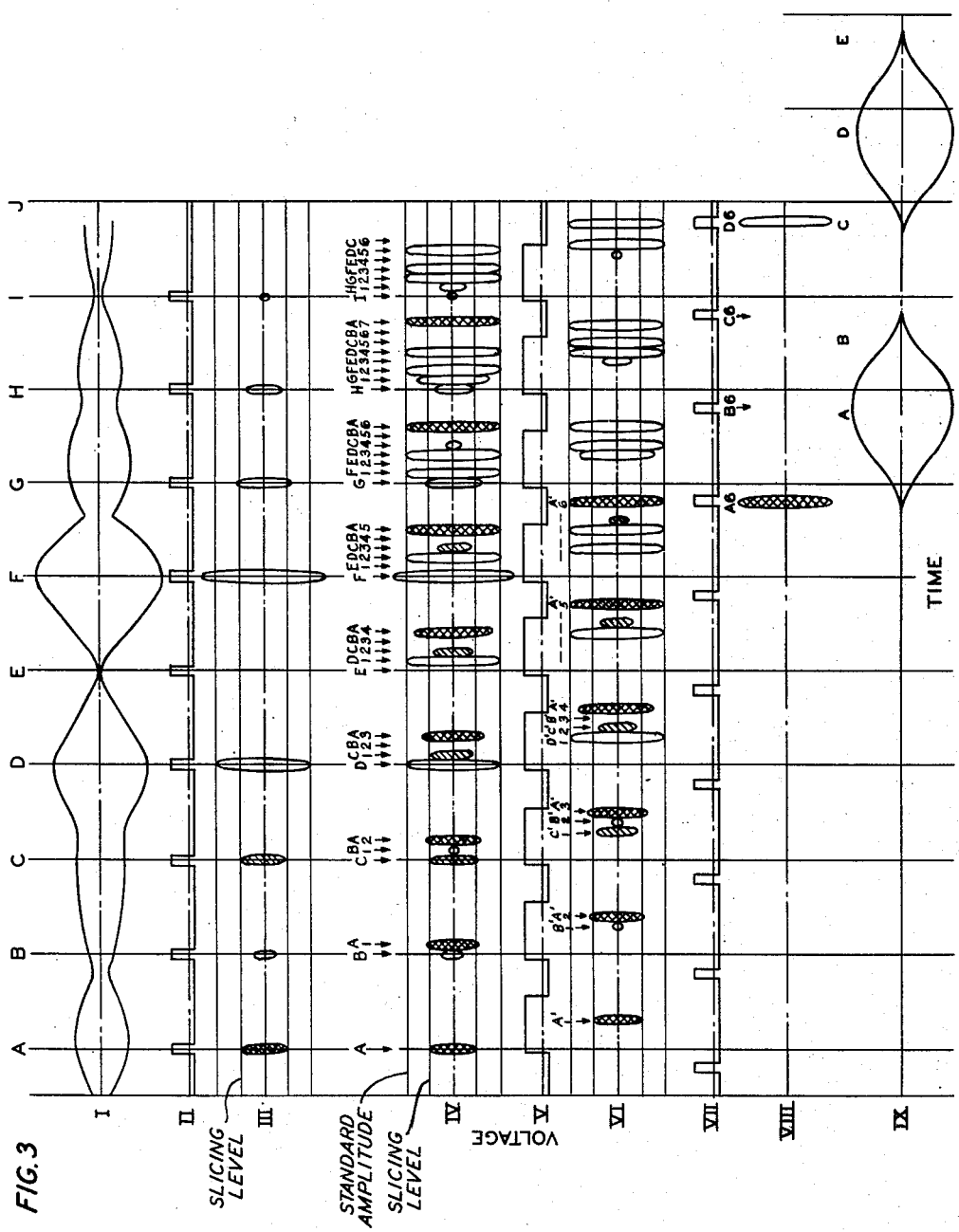

Fig. 3 comprises wave forms illustrative of Fig. 2;

Fig. 4 is a pictorial view of a hybrid junction;

Fig. 5 shows typical characteristic curves of an expander, and a limiter, both individually and combined; and Fig. 6 shows, in schematic, a hybrid gate.

Figure 1:
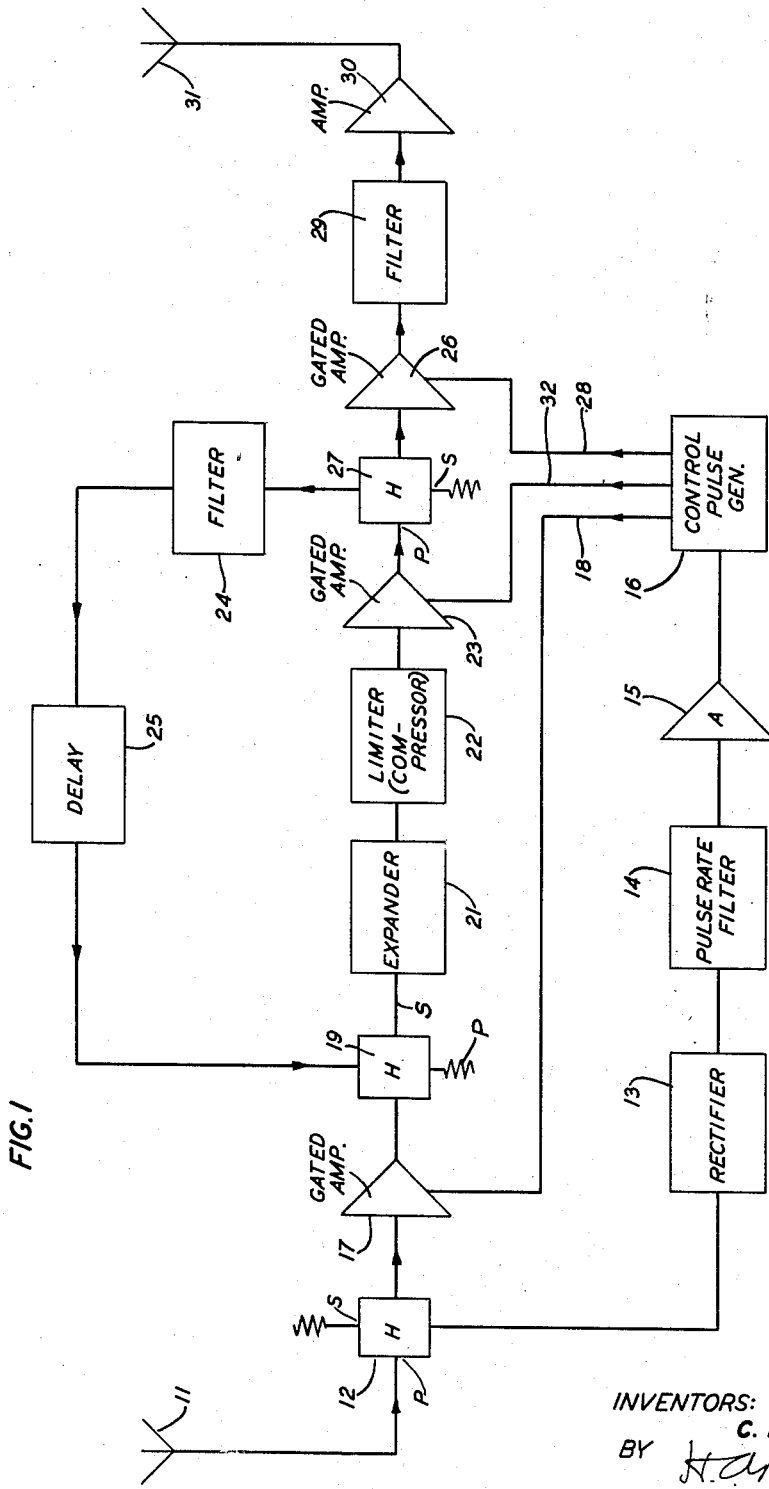
Fig. 1 is a block schematic diagram of a pulse repeater embodying principles of the invention.

The general operation of a specific repeater illustrative of the present invention will now be described with particular reference to Fig. 1. The incoming signal comprising pulses and spaces is received by the antenna 11 and passes into the hybird junction 12. Although the signal was originated with pulses of a uniform amplitude, the signal when received at the repeater may be distorted by noise, for example, and appear as illustrated by waveform I of Fig. 3. Half of the power entering the hybrid junction 12 is applied to a timing circuit which comprises the rectifier 13, a pulse rate filter 14, an amplifier 15 and a control pulse generator 16. The filter 14 is a narrow band pass filter tuned to the nominal pulse repetition rate of the incoming signal and its output will be a sine wave whose frequency is accurately determined to be the average repetition frequency of the input pulses. Three pulse trains are derived from the amplified since wave by the pulse generator 16 for uses which will subsequently be apparent.

The power entering hybrid junction 12 which is not applied to the timing circuit is applied to the input of gated amplifier 17. The gate 17 is normally closed but is opened for a relatively small portion of a pulse period at the mid-period of the nominal pulse occurrence time by the control wave appearing on lead 18 which is the first of the aforementioned three pulse trains. (A "pulse period" is herein defined as the nominal time between adjacent pulse centers.) A narrow segment of the incoming signal is thus gated and amplified by amplifier 17 at each pulse occurrence time. The gated segment is applied to the input of hybrid junction 19 which comprises the input to the circulating pulse regenerator.

The circulating pulse regenerator is a loop circuit which comprises the expander 21, limiter 22, amplifier 23, filter 24, and delay circuit 25. The order in which the elements of the loop circuit are connected together may be varied and, as shown, is illustrative only. Further, the desired characteristics of the loop may be embodied in a lesser or a greater number of devices than that shown. As previously mentioned the expander will amplify all pulses greater than a predetermined amplitude and attenuate all others. The limiter 22 determines the peak amplitude to which the circulating pulses can be increased and the amplifier 23 has sufficient gain to make up the losses of the loop so that it has unity gain for pulses of one-half standard amplitude. The filter 24 is a broad band device denoting the selectivity of the entire loop circuit. The delay circuit 25 controls the period of the circulating pulses and hence controls the time that a pulse will return to the point of its injection into the loop, viz., the hybrid junction 19.

Amplifier 23 is a gated device which is open while the pulses are circulating for their predetermined number of trips through the loop. Amplifier 26 is connected to the output of the loop which comprises the hybrid junction 27 and is also a gated device but is normally closed. Under the control of the pulse train appearing on output lead 28 of generator 16, the amplifier 26 is gated open when a pulse segment has completed its predetermined number of trips through the expander 21, and amplifier 23 and appears in hybrid junction 27 so that the reshaped segment is amplified and gated into the output. The pulse is shaped by filter 29 and, after amplification by amplifier 30, is transmitted by the antenna 31. After a pulse segment has been gated out of the loop, the control pulse train appearing on lead 32 closes the gated amplifier 23 the next occurrence time of the now unwanted pulse at the input of amplifier 23 to insure complete removal from the loop.

As previously mentioned, the pulse segments are recirculated through the reshaping portions of the loop circuit, viz., the expander, limiter and amplifier 23, to insure that the pulses are increased to the standard amplitude determined by the limiter 22 and to attenuate the noise to zero. If the total delay of the loop is less than one pulse period it is theoretically possible to recirculate a pulse through the expander, limiter and amplifier without the intervention of a subsequent pulse. For example, if the total loop delay is equal to one-tenth of a pulse period and if the sample taken from the incoming pulse is equal to or shorter than one-tenth of a pulse period, a pulse segment may make ten trips through the loop without interfering with a subsequent pulse.

At microwave frequencies, it may be impossible to attain such short delays in which case it may be advisable to adjust the loop delay by means of the delay circuit 25 to make it greater than a pulse period, for example 1.1 periods. Ten trips through the loop without interference would still be possible although the pulses will be interleaved as will be illustrated hereinafter. That is, segments from ten different pulses may be circulating through the loop during any one pulse period.

Other loop delays are also possible. The major consideration is that a pulse during its predetermined circulating period must not return to the loop input at the occurrence time of a subsequent pulse. Further, the maximum number of trips through the loop consistent with good operation will usually be desirable in order to insure standardization of pulses at a uniform amplitude and attenuation of noise during spaces to substantially zero. It is of course necessary to take sufficiently short samples from the incoming signal, both in order to take that portion of the signal which is most representative of the original signal, and also in order that the segments will be sufficiently short so that they can be recirculated through the loop as many times as desired without interference.

The invention will now be described in detail with reference to the specific embodiment shown in Fig. 2 and to the wave forms of Fig. 3. In the present illustration, the loop delay is 1.1 pulse periods and the length of the segments is .1 of a period. Input signal energy from the antenna 11 of Fig. 1, illustrated by wave form I of Fig. 3, enters the $p$-arm of hybrid junction 12. A hybrid junction is illustrated pictorially in Fig. 4 and is described in Patent 2,445,895 to W. A. Tyrrel, dated July 27, 1948.

The hybrid junction illustrated in Fig. 4 comprises two pairs of conjugately related wave guide arms. One pair comprises two colinear arms designated $a$ and $b$, respectively. The other pair comprises an arm joined in the electrical plane of the colinear arms and another arm joined in the magnetic plane of the colinear arms. Since electromagnetic energy which enters the arm joined in the electrical plane will be in phase in the $a$ and $b$ arms at equal distances from the junction, the arm is identified as the parallel or $p$-arm. Similarly, from the phase relations of energy entering the $a$ and $b$ arms from the arm joined in the magnetic plane, this latter arm is identified as the series or $s$ arm. Due to the conjugate relationship of the arms there is no direct coupling between the $p$ and $s$ arms or between the $a$ and $b$ arms. The hybrid junction 12 as used herein makes no especial use of the conjugacy feature but is employed merely as convenient tapping means.

The energy which enters the $p$ arm of the hybrid junction 12 will therefore divide between the $a$ and $b$ arms. The $s$ arm is terminated in its characteristic impedance to absorb any energy which may be reflected from either the $a$ or $b$ arms. Energy entering the $b$ arm is rectified by the crystal rectifier 13 and applied to the filter 14 which, as previously described, is a narrow band filter tuned to the nominal pulse repetition rate. The sinusoidally varying output of filter 14 is amplified by amplifier 15 and applied to the control pulse generator 16. The control pulse wave forms generated by generator 16 are illustrated as wave forms II, V, and VII of Fig. 3 and may be generated by any of the means well known in the art such as clipping, delay line pulse shortening or delay line time positioning. These three wave forms appear on output leads 18, 32, and 28 respectively.

Energy entering the $a$ arm of hybrid junction 12 is applied to the input of traveling-wave amplifier 17 illustrated schematically as comprising a cathode 41, control grid 42, accelerating anode 43, helix 44 and collector 45. Traveling-wave amplifiers are described in articles in the February 1947 Proc. I. R. E. entitled "Traveling-Wave Tubes" by J. R. Pierce and L. M. Field at page 108, "Theory of the Beam-Type Traveling-Wave Tube" by J. R. Pierce at page 111 and "The Traveling-Wave Tube, as an Amplifier at Microwaves" by R. Kompfner at page 124.

Appropriate bias potentials are applied to the electrodes of the traveling-wave amplifier 17 by the battery 46. The grid 42 is connected through the resistor 47 to a point on the battery 46 sufficiently negative with respect to the cathode to cut off the flow of electrons from the cathode. The tube therefore will not amplify and is hence normally inoperative or closed. Some energy will pass through the tube irrespective of the cut-off beam but with a normal tube this energy will be over thirty decibels down from the amplified output and hence negligible.

The gate 17 is opened at the mid-period of the nominal pulse occurrence time by the positive control pulses which appear on output lead 18 of the pulse generator 16. When a positive control pulse is applied to the control grid 42 through condenser 48, the grid is driven to the cathode potential and the tube 17 will amplify for the duration of the control pulse. For illustrative purposes, these control pulses are illustrated in wave form II of Fig. 3 and are one-tenth of a pulse period in length. Therefore, a short segment of the input signal, proportional to its instantaneous amplitude is gated through and amplified for one-tenth of the period followed by a blank interval of nine-tenths of a period. The resulting envelope of the energy appearing in wave guide 49 will appear as wave form 3 of Fig. 3. The pulse segments have been labeled at the center of the nominal pulse occurrence times and some have been shaded to facilitate identification as their progress through the repeater is traced.

The pulse segments appearing in wave guide 49 enter the $b$ arm of hybrid junction 19 and pass by way of the $s$ arm thereof to the input of expander 21. Expander 21 comprises a hybrid junction of the type shown in Fig. 4, but with the conjugate $a$ and $b$ arms terminated in crystal rectifiers 50. The crystals 50 provide a variable impedance termination for the wave guide sections and control the amount of energy that is reflected from the $a$ and $b$ arms. One of the arms, for example, the $b$ arm is a quarter of a wavelength longer than the other, $$\left(l+\frac{\lambda}{4}\right)$$

so that the $a$ and $b$ arms reflect energy into the $s$ arm in an additive manner.

The expander characteristic shown as curve $a$ of Fig. 5 is obtained by matching the impedance of the crystals to the impedance of their corresponding arms for low signal amplitudes. This results in substantially no reflection of the low levels from the $a$ and $b$ arms and hence relatively high attenuation of such signals. As the input signal level increases, the $a$ and $b$ arms will become progressively mismatched due to the non-ohmic resistance characteristic of crystal rectifiers and the higher level will be more completely reflected. The level at which the crystals are matched to their respective wave guide sections is controlled by impedance matching devices in a well-known manner. An expander of the type described is disclosed in a copending application of C. C. Cutler, Serial No. 118,890, filed September 30, 1949.

The expanded output from the $s$ arm of the expander is applied to the input of the limiter 22 which is structurally similar to the expander 21. However, the crystal rectifiers 51 of the limiter are matched to their respective arms at a predetermined high level to limit the amplitude of the pulse segments to the desired peak amplitude. The limiter characteristic is shown as curve $b$ of Fig. 5. A limiter of the type described is disclosed in a copending application of A. F. Dietrich, Serial No. 118,856, filed September 30, 1949. The net effect of the expander and limiter is illustrated by the combined expander-limiter characteristic, shown as curve $c$ of Fig. 5.

As previously mentioned, it is desired to reduce all pulse segments of less than one-half of a standard amplitude to zero so that a space will result and to increase all pulse segments of greater than one-half standard amplitude to unity standard amplitude, or, to limit them to this value if previously greater. Therefore, a pulse of exactly one-half standard amplitude should remain unchanged by the loop and hence controls the loop again.

To establish unity loop gain for pulses of one-half standard amplitude, the pulse segments are amplified by traveling-wave amplifier 23 which compensates for the losses distributed through the loop. Amplifier 23 is similar to amplifier 17 with the biasing potentials supplied by battery 52. Also, control pulses from generator 16 are applied by the lead 32 and condenser 53 to the control grid of the tube. It may be seen by reference to wave form V of Fig. 5 that the control pulses supplied over lead 32 are positive while the pulse segments are circulating in their predetermined manner so that the amplifier 23 is a normally open gate.

The curves of Fig. 5 have been plotted with a double ordinate. The right-hand ordinate indicates the relative output of only the expander and/or limiter. The left-hand ordinate indicates the output of the complete loop and includes the amplification introduced by amplifier 23 as well as the distributed losses in the loop. It may be seen that the unity loop gain line intersects the combined expander-limiter characteristic at one-half standard amplitude relative input so that a pulse of this amplitude will theoretically circulate unchanged. In a practical case, small variations will change such a pulse sufficiently to cause it to go one way or the other.

From the characteristic of the complete loop, it may be seen that loop gain is reduced below unity as the signal level decreases below one-half standard amplitude. For pulses of greater than one-half standard amplitude, the loop has a gain of greater than unity as long as the pulses do not exceed the limit set by the limiter 22. For the chracteristic shown, the loop gain increases as the input level approaches .7 unit of standard amplitude at which level the limiter prevents any appreciable further increases. Inputs of greater than .7 unit reappear at the expander 21 input with standard amplitude.

The amplified and partially reshaped pulses appearing in wave guide 54 are returned to the input of expander 21 by way of the $p$ and $a$ arms of hybrid junction 27, the filter 24 comprising the irises 55 the coaxial line 25′ and the $a$ and $s$ arms of hybrid junction 19. The total delay of the loop is controlled by cutting the coaxial line 25′ to the proper length which in the present illustrative case would be sufficient to give the loop a total delay of 1.1 pulse periods.

Part of the power applied to hybrid junction 27 is applied to the input of traveling-wave amplifier 26 which is similar to amplifiers 17 and 23, and is biased in a similar manner by battery 56. When a pulse which has not completed its predetermined number of useful trips through the loop appears in hybrid junction 27, the electron beam of tube 26 is cut off by the negative bias on the grid and no appreciable energy appears in output wave guide 57. However, when a pulse which has made six trips through the expander 21, limiter 22 and amplifier 23 appears in hybrid junction 27, a positive pulse from control pulse generator 16 is applied to the control grid of tube 26 by way of lead 28 and condenser 58. The reshaped pulse will therefore appear in amplified form in wave guide 57 and after shaping by filter 29 will be passed to the amplifier 30 and output antenna 30 of Fig. 1.

Even though a pulse is gated out of the loop, a portion of it will continue to circulate in the loop and if not removed would eventually interfere with a subsequent pulse. To this end, a negative pulse is applied to the control grid of amplifier 23 from generator 16 at a time after the pulse is gated out of the loop by amplifier 26 equal to the delay of the loop between the hybrid junction 27 and the input to amplifier 23 by way of the coaxial line section 25′. The pulse segment therefore completes seven trips through the expander and limiter but is blanked on the seventh trip by amplifier 23.

The timing and reshaping of the pulse segments will now be explained with particular reference to Fig. 3. A sample of the input wave, wave form I is taken at the mid-period of the nominal pulse occurrence time by the action of control pulses, wave form II which open the input gate. The gate segments appearing in the output of the input amplifier wave form III are proportional in amplitude to the instantaneous amplitude of the signal wave and equal in length to the length of the control pulses which open the gate.

The pulses appearing in hybrid junction 19 are shown as wave form IV. The first gated pulse segment, pulse A, is just greater than the slicing level which is the half standard amplitude previously referred to. Assuming that its actual magnitude is .51 units, it may be seen from the loop characteristic of Fig. 5 that after one trip through the expander, limiter and amplifier, pulse A will reappear after a delay of 1.1 pulse periods at the input of the expander as a loop of .52 unit. This pulse is indicated on wave form IV as pulse $A_1$, the subscript denoting the number of completed trips through the loop. A second trip will increase the pulse to .545 unit, as indicated at $A_2$ and a third trip will increase the segment to .62 unit as shown by $A_3$. The fourth trip will increase the pulse to .83 unit and a fifth trip will bring it to the standard amplitude of one unit as shown at $A_4$ and $A_5$ respectively. The pulse will therefore remain unchanged by its sixth and final trip through the loop.

Pulse segment B is less than .5 unit and is attenuated to zero on the second trip through the expander. Pulse C has an amplitude of .49 unit and is not removed until after the fourth trip through the loop. Pulse D is exactly unity amplitude and circulates unchanged. Pulse F is greater than unity amplitude and after being limited to one unit on its first trip through the loop, circulates as a pulse of standard amplitude.

The envelope of the pulses appearing at hybrid junction 27 are shown as wave form VI of Fig. 5. These pulses have not been delayed by delay line 25 but only by amplifier 23 and associated wave guide which fact is indicated by the prime imposed on the pulse designations. The timing of the control pulses of wave form VII is determined from the delay between hybrid junction 19 and hybrid junction 27 and the relative location in a pulse period of a pulse segment which has completed its predetermined number of useful trips through the loop. In the illustrative example, the delay between hybrid junctions 19 and 27 is .25 pulse period. Further since the loop delay is equal to 1.1 periods and each pulse makes six reshaping trips through the expander and associated amplifier, a pulse segment is gated from the loop on the trip which it commences centered at .5 unit of a pulse period that is, 5.5 periods after having entered hybrid junction 19. The control pulses of wave form VII which open the output gate are therefore delayed .5 plus .25 unit of a pulse period with respect to the control pulses of wave form I which open the input gate. This may readily be seen from the wave forms of Fig. 3.

The output pulses after amplification by amplifier 26 and shaping by filter 29 appear as shown in wave form VIII.

As previously mentioned, the portion of a pulse which remains in the loop after its specified reshaping trips through the loop must be removed or it will continue to circulate and eventually coincide with a subsequent pulse, namely, after its ninth trip through the loop in the specific example being described. This may be accomplished by a gate connected to the $a$ arm of hybrid junction 27 which is normally open but which is closed when gated amplifier 26 is open. However, as shown in Fig. 2, the amplifier 23 will also serve the purpose even though the maximum number of useful trips will be decreased by one. The timing of the control pulses of wave form V which control the gating of amplifier 23 is determined mainly by the number of trips that a pulse is required to make and the loop delay. In the instant embodiment, the gate is held open for .6 of a period to permit the six pulses normally circulating to pass and then closed for .4 of a period to block any unwanted pulses. If the pulses were to make eight useful trips through the loop, the pulses of wave form V would be positive for .8 of a period and negative for .2 which would reduce the unused portion of the cycle.

If the pulse period is extremely short, the number of trips through the loop may be decreased if desired by inserting additional expanders in the repeater.

It will be noted that the incoming pulses are not only reshaped but are also accurately retimed. Even though the time separation of adjacent incoming pulses may vary from pulse to pulse, the frequency of the output of the timing circuit comprising the rectifier 13 pulse rate filter 14 and pulse generator 16 will change only in response to the slow variations in the pulse repetition rate so that those pulses whose peaks have been shifted slightly from their nominal occurrence time will be returned to their proper occurrence time relative to the other pulses as is shown by the wave forms of Fig. 3. Also, the timing circuit is designed to have sufficient "flywheel" effect so that the control pulse trains will be unbroken even through there are no pulses for several periods.

It may be desired to separate the gating function from the input and output amplifiers 17 and 26 if, for example, sufficiently wide band control of the traveling-wave tube electron current cannot be obtained with the grid-cathode structure or where better gains and stabilities can be obtained by separating the two functions. The traveling-wave amplifiers 17 and 26 would therefore be biased in the manner normal for amplification and additional gates could be connected before the respective amplifiers. For example, hybrid gates such as shown in Fig. 6 could be used. These gates are structurally similar to the expander 21 and limiter 22. The crystal rectifiers 61 are matched to their associated wave guide arms so that they normally present, to incident energy, an impedance equal to the characteristic impedance of the guide and hence absorb most of the input power. When the gate is to be opened, a control pulse of the proper polarity is applied to the crystals over lead 62. The amplitude of the control pulse is sufficient to give the crystals a high impedance and hence a high degree of mismatch so that all of the input power will be reflected in proper phase into the output arm of the hybrid junction.

Since the structure of the blanking gate shown in Fig. 6 is similar to that of the expander and limiter, either of the latter may be connected to perform the blanking function as well as their normal function.

Although the invention has been described with particular reference to a specific embodiment, numerous other modifications will readily occur to one skilled in the art without deviating from the spirit or scope of the invention. Further, the invention is not limited in its application to pulse repeaters; for example, it may be applied to terminal, testing, or other radio equipment wherein it is desired to periodically sample a signal wave and to alternatively increase or attenuate the amplitude of the sample.

What is claimed is:

1. A pulse shaping circuit for periodic pulses which comprises means for gating a narrow segment in time of each of said pulses at the mid-period of the nominal pulse occurrence times, a circulating pulse regenerator comprising an expander, a limiter, a pulse amplifier and a delay circuit connected in a loop circuit, means for injecting said narrow segments into said circulating pulse regenerator, means connected to said loop circuit for gating said sections out of said circulating pulse regenerator after a predetermined number of traversals through said loop, and means in said loop circuit to remove the portion of any pulse which remains in said circulating pulse regenerator after the nominal time for its removal from said regenerator.

2. A pulse shaping circuit for periodic pulses which comprises a circulating pulse regenerator comprising an expander, a limiter, and a pulse amplifier connected in a loop circuit, means to gate a narrow section in time of each of said pulses at the mid-period of its nominal occurrence time into said pulse regenerator, means to gate said section out of said pulse regenerator after a predetermined number of traversals of said loop circuit, and means operative after the removal of a section from the loop to remove any portion thereof which may remain in said pulse regenerator.

3. A pulse regenerator for periodic pulses which comprises means to receive the signal wave bearing said pulses, a circulating pulse regenerator comprising an expander, a limiter, a pulse amplifier connected in a loop circuit, an input gate connected to said loop circuit, means to apply said pulses to said input gate, a second circuit connected to receive said pulses which derives from the incoming signal a first control wave comprising control pulses which occur at the mid-period of the nominal signal pulse occurrence time, said control pulse being narrow relative to said signal pulses, means to apply said first control wave to said input gate to open it during the occurrence of said control pulses, an output gate connected to said loop circuit, means comprising said second circuit to derive a second control wave comprising control pulses which occur at the predetermined and unique time that the pulses circulating in said loop shall appear at the input to said output gate after a predetermined number of traversals through said loop, means to apply said second control wave to said output gate to open it during the occurrence of the control pulses which comprise said second wave, means comprising said second circuit to derive a third control wave which comprises pulses occurring simultaneously with the occurrence time of a circulating pulse at said amplifier during the first traversal of that pulse through said loop subsequently to its removal from said regenerator, and means to supply said third control wave to said amplifier to render it inoperative during the occurrence of the pulses which comprise the said third control wave.

4. A pulse-shaping circuit for periodic pulses which comprises means for gating said pulses to obtain narrow segments therefrom, a loop circuit comprising an expander, a limiter, and a pulse amplifier, means for injecting said segments into said loop circuit and means for abstracting said segments from said loop circuit at a later time.

5. A pulse-shaping circuit for periodic pulses of an originally standard amplitude which comprises an input circuit for gating said pulses to obtain narrow segments therefrom, an expander adapted to increase the amplitude of all segments of greater than a predetermined portion relative to all other segments, a pulse amplifier, a limiter adapted to set a maximum amplitude for said segments, circuit means to recurrently circulate said segments through said expander, said amplifier and said limiter, an output circuit, and means for gating said segments into said output circuit after a predetermined number of traversals through said expander and amplifier.

6. The combination in accordance with claim 5 wherein said circuit means comprises a delay circuit proportional to circulate said segments through said expander and amplifier for their said predetermined number of traversals without overlapping.

7. A pulse-shaping circuit for periodic pulses of an originally standard amplitude which comprises an input circuit to receive the signal wave bearing said pulses, a timing circuit connected to said input circuit for deriving a plurality of control waves comprising trains of recurrent pulses of predetermined occurrence times relative to said periodic pulses, means under control of a first of said pulse trains for gating a narrow segment of said signal wave at the mid-period of each nominal pulse occurrence time, a circulating pulse regenerator, means for injecting said segments into said regenerator, said regenerator comprising means for increasing the amplitude of all segments greater than a predetermined portion of said standard amplitude relative to all others, means to limit the maximum amplitude of said segments, and means to amplify said segments connected in a loop circuit, an output circuit, and means under control of a second of said pulse trains for gating each of said segments into said output circuit after a predetermined number of traversals through said loop.

8. The combination according to claim 7 and means in said loop circuit under control of a third of said pulse trains for blanking any portion of said segments which should remain in said loop circuit after their predetermined number of traversals through said loop.

9. A pulse regeneration circuit for recurrent pulses which comprises means to gate said pulses to obtain short segments representative of the instantaneous amplitude of said pulses at their nominal occurrence time, a loop circuit containing a non-linear element adapted to increase the amplitude of all segments of greater than a predetermined amplitude relative to all others, an amplifier and a limiter, means to inject said segments into said loop circuit, means to abstract said segments from said loop after a predetermined number of traversals through said loop, and means for disabling said amplifier during the portion of each pulse period that segments undergoing their predetermined number of traversals are not present at the input of said amplifier.

10. A pulse regeneration circuit for recurrent pulses which comprises a loop circuit having an input, means for increasing the amplitude of all input signals greater than a predetermined amplitude relative to all others, a limiter, an amplifier, and an output, a timing circuit comprising means to derive a voltage having a frequency equal to the average repetition rate of input pulses, means to apply said recurrent pulses to said timing circuit, means to derive from said voltage a first train of control pulses narrow relative to said recurrent pulses and synchronized with the mid-period of the nominal pulse occurrence times, means under control of said first train of pulses to gate said recurrent pulses to obtain narrow segments therefrom, means to apply said segments to said input, means comprising said voltage to derive a second train of control pulses of substantially the same width as the pulses of said first train and synchronized with the occurrence at said output of segments which have completed a predetermined number of traversals through said loop, and means under control of said second train of pulses to abstract said segments from said loop.

11. The combination in accordance with claim 10 and a delay circuit in said loop circuit adjusted to return said segments during their predetermined circulating period to the input of said loop at a time other than the occurrence time of one of said recurrent pulses.

12. The combination in accordance with claim 10 and a delay circuit in said loop circuit which has a delay proportioned to return each of said segments to said input immediately subsequent to the application of a subsequent segment to said input.

ROBERT L. CARBREY.
CASSIUS C. CUTLER.
CARL B. H. FELDMAN.

References Cited in the file of this patent

UNITED STATES PATENTS

| Number | Name | Date |
|---|---|---|
| 2,429,227 | Herbst | Oct. 21, 1947 |
| 2,468,058 | Grieg | Apr. 26, 1949 |
| 2,482,973 | Gordon | Sept. 27, 1949 |